US012607242B2

(12) United States Patent
Roncen et al.

(10) Patent No.: US 12,607,242 B2
(45) Date of Patent: Apr. 21, 2026

(54) VIBRATION ABSORBING DEVICE WITH A WEIGHTED MEMBRANE AND FLUID DISPLACEMENT

(71) Applicants: LIEBHERR-AEROSPACE TOULOUSE SAS, Toulouse (FR); INSTITUT SUPÉRIEUR DE L'AÉRONAUTIQUE ET DE L'ESPACE, Toulouse (FR)

(72) Inventors: Thomas Roncen, Toulouse (FR); Vincent Manet, Toulouse (FR); Guilhem Michon, Toulouse (FR)

(73) Assignees: LIEBHERR-AEROSPACE TOULOUSE SAS, Toulouse (FR); INSTITUT SUPÉRIEUR DE L'AÉRONAUTIQUE ET DE L'ESPACE, Toulouse (FR)

( * ) Notice: Subject to any disclaimer, the term of this patent is extended or adjusted under 35 U.S.C. 154(b) by 205 days.

(21) Appl. No.: 18/025,832

(22) PCT Filed: Sep. 9, 2021

(86) PCT No.: PCT/EP2021/074858
§ 371 (c)(1),
(2) Date: Mar. 10, 2023

(87) PCT Pub. No.: WO2022/053579
PCT Pub. Date: Mar. 17, 2022

(65) Prior Publication Data
US 2023/0366443 A1 Nov. 16, 2023

(30) Foreign Application Priority Data

Sep. 10, 2020 (FR) ................................. FR2009162

(51) Int. Cl.
| | |
|---|---|
| *F16F 13/10* | (2006.01) |
| *F16F 7/112* | (2006.01) |
| *F16F 7/116* | (2006.01) |

(52) U.S. Cl.
CPC .............. *F16F 7/112* (2013.01); *F16F 7/116* (2013.01)

(58) Field of Classification Search
CPC .. F16F 7/112; F16F 7/116; F16F 13/10; F16F 13/105; F16F 13/107; F16F 13/24; F16F 7/104; F16F 7/108
See application file for complete search history.

(56) References Cited

U.S. PATENT DOCUMENTS

| | | | | |
|---|---|---|---|---|
| 2,387,065 A | * | 10/1945 | Harding | F16F 13/08 188/298 |
| 4,458,888 A | * | 7/1984 | Wolf | F16F 13/18 267/141 |

(Continued)

FOREIGN PATENT DOCUMENTS

| | | |
|---|---|---|
| CN | 203413011 U | 1/2014 |
| CN | 106884920 A | 6/2017 |
| JP | H06294442 A | 10/1994 |

*Primary Examiner* — Thomas W Irvin
(74) *Attorney, Agent, or Firm* — CRGO Global; Steven M. Greenberg

(57) ABSTRACT

Vibration absorbing device comprising a housing (12), a membrane (14) enclosed in the housing (12) and thus forming two chambers (18a, 18b) in the housing (12), said chambers (18a, 18b) being filled with a fluid, at least one weight (16), arranged on the membrane (14) in order that a movement of the weight (16) causes a movement of the membrane (14), and at least one duct (24) arranged to permit the fluid to flow between the two chambers (18a, 18b) if the membrane (14) and the weight (16) move.

9 Claims, 3 Drawing Sheets

(56)                   References Cited

U.S. PATENT DOCUMENTS

| | | | | | |
|---|---|---|---|---|---|
| 4,955,589 | A * | 9/1990 | West | ................... | F16F 13/24 |
| | | | | | 267/219 |
| 9,500,258 | B2 * | 11/2016 | Verger | ................... | F16F 13/20 |
| 10,449,819 | B2 * | 10/2019 | Delorenzis | ............... | F16F 7/10 |
| 10,549,621 | B2 * | 2/2020 | Yun | ................... | F16F 13/106 |
| 11,465,483 | B2 * | 10/2022 | Ito | ................... | B60K 5/1225 |
| 2015/0276009 | A1 * | 10/2015 | Verger | ................... | F16F 13/20 |
| | | | | | 267/121 |
| 2016/0153512 | A1 * | 6/2016 | Rosenhagen | ............ | F16F 7/116 |
| | | | | | 188/380 |
| 2018/0257449 | A1 * | 9/2018 | Delorenzis | ............. | B60G 11/27 |
| 2019/0111772 | A1 * | 4/2019 | Yun | ................... | F16F 13/10 |
| 2020/0269672 | A1 * | 8/2020 | Ito | ................... | B60K 5/1241 |

* cited by examiner

[Fig. 1]
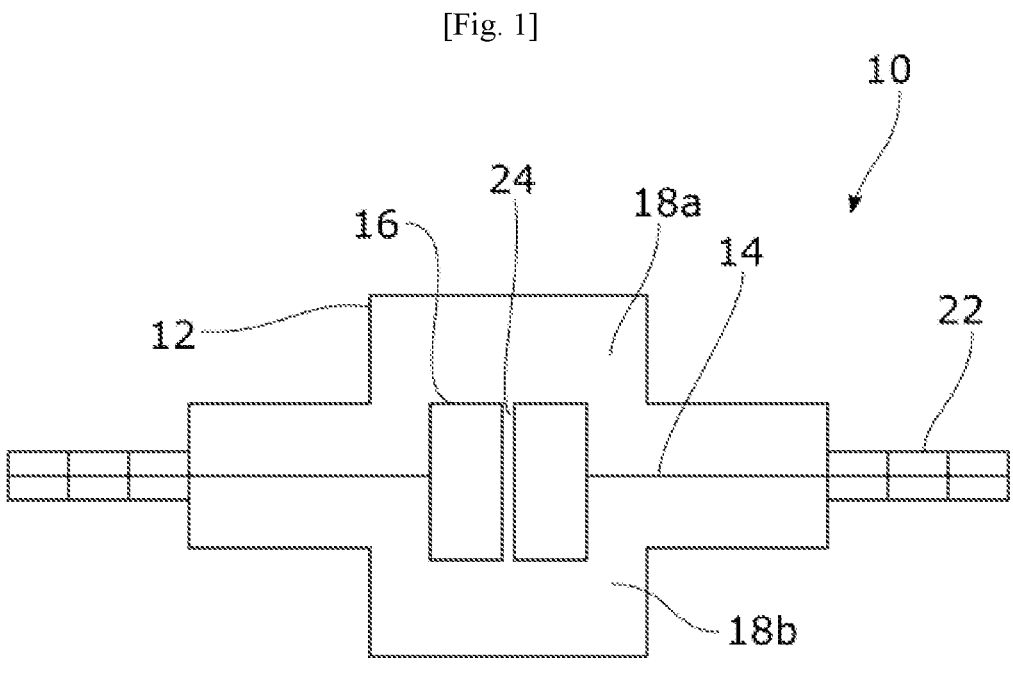
[Fig. 2]
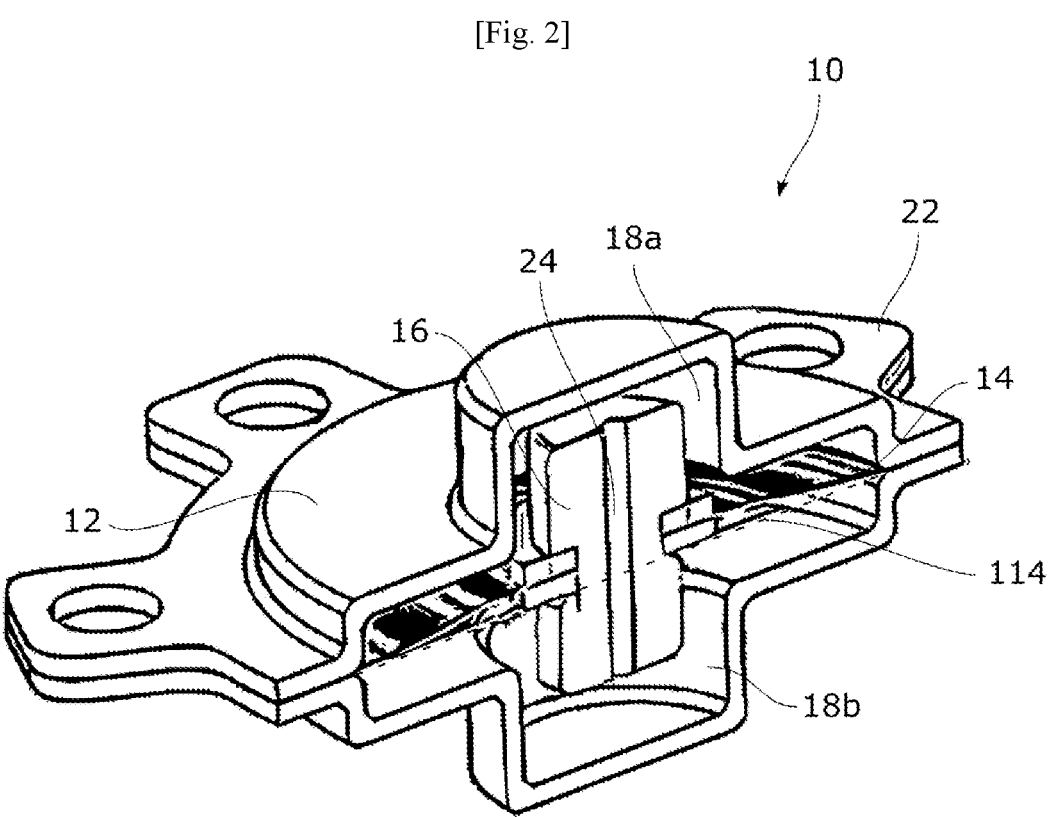

[Fig. 3]
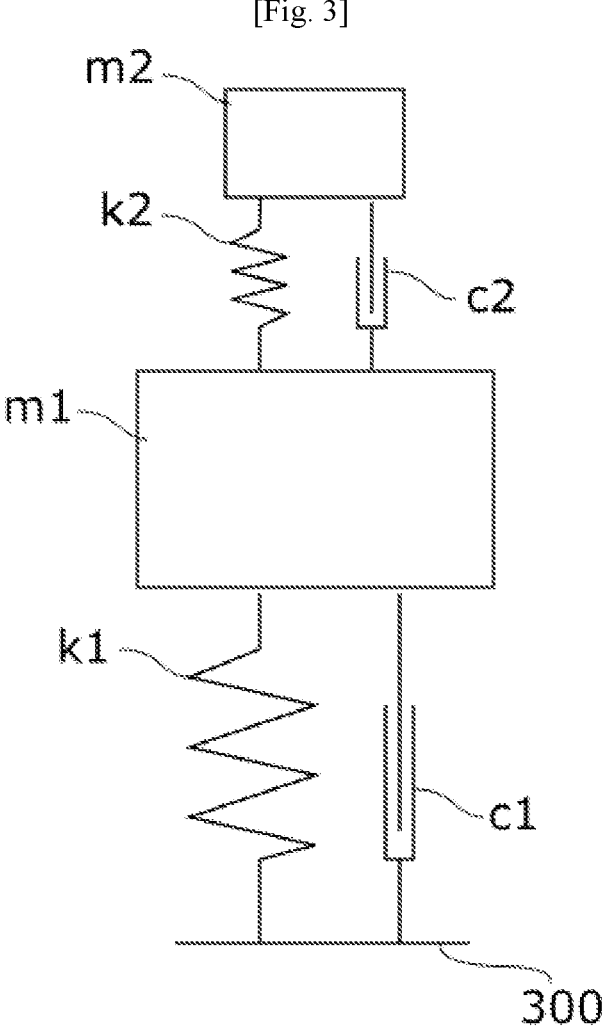

[Fig. 4]
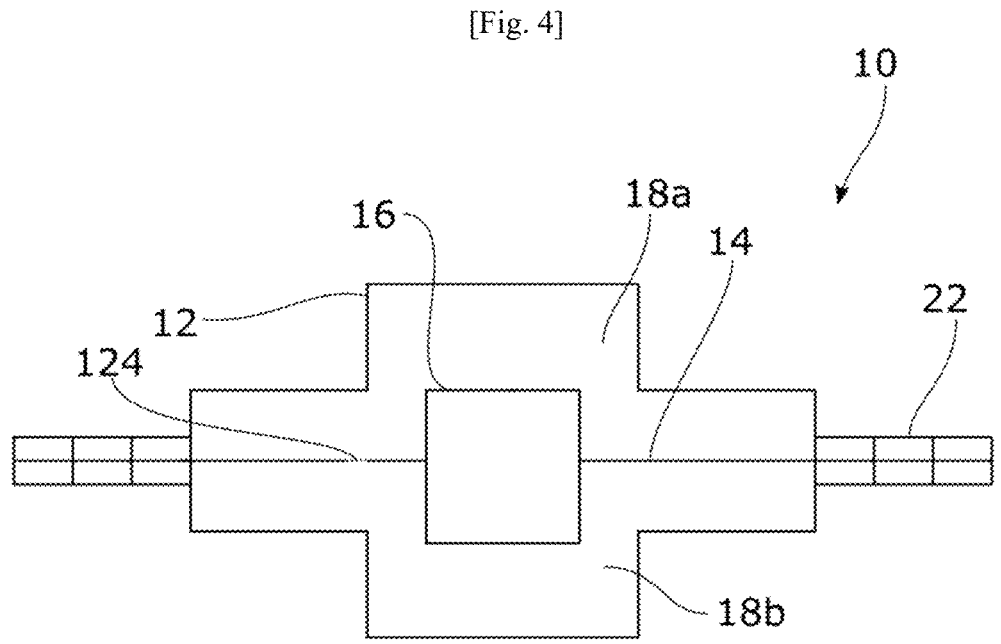

VIBRATION ABSORBING DEVICE WITH A WEIGHTED MEMBRANE AND FLUID DISPLACEMENT

CROSS-REFERENCE TO RELATED APPLICATIONS

This application is a § 371 national phase entry of International Application No. PCT/EP2021/074858, filed Sep. 9, 2021, which claims priority to French Patent Application No. 2009162 filed on Sep. 10, 2020.

TECHNICAL FIELD OF THE INVENTION

The invention relates to a vibration absorbing device. In particular, the invention relates to a vibration absorbing device able to be used to damp the amplitudes of vibrations and to be installed on a component which is intended to be protected.

TECHNOLOGICAL BACKGROUND

A vibration absorbing device installed on a component enables this component to be protected from the amplitudes of vibrations which may be exerted thereon. These vibration-related problems are encountered in particular in the case of components mounted in vehicles, e.g. automotive, rail-bound or aeronautical vehicles, owing to the movements to which the components mounted in these vehicles are subjected.

A number of types of vibration absorbing devices are currently known.

A first type of vibration absorbing device is e.g. a non-linear energy sink or NES. The fundamental principle of the NES is to trigger an instability on the secondary resonator, said instability tending towards a relaxation limit cycle which will permit the dissipation of energy. The NES is a simple device formed from a useful mass, an element with a non-linear stiffness and a dissipative element.

The main disadvantage with the NES-type devices is that the elements from which they are constructed, in particular elastomers, are not able to withstand high temperatures. By way of example, most of the elastomers used in current NESs melt at around 200° C. These elastomers are the elements which carry out the damping function of the NES and are thus indispensable in the prior art devices. It is not generally possible to replace these materials because no material which is resistant to high temperatures has damping properties sufficiently good to be used in a vibration absorbing device.

A second type of vibration absorbing device is e.g. a non-linear viscous damper or NVD. The fundamental principle of the NVD is to connect two points which vibrate in opposite phase by a piston, the movement of which will be braked by a fluid. The NVD device is simple and has good fatigue behavior.

It has various disadvantages: e.g. depending on the fluid used, leakage problems may occur in the NVD. The fluid used is generally viscous, e.g. oil, which can cause problems at high temperatures, e.g. an explosion if the oil is under pressure. Finally, one major disadvantage is that the NVD requires two points of attachment: each point of attachment is connected on the one hand to one of the two points vibrating in opposition and on the other hand to the piston or to the cylinder surrounding the piston. Thus the NVD cannot be used with a single point of attachment on the component to be protected.

In theory, the NVD can operate with any fluid. However, NVDs have a piston mechanism constrained to move at a relatively low speed between two pieces of equipment (one piece of equipment per point of attachment). Thus the NVD generally operates with a viscous fluid which dissipates energy at low speeds.

The inventors have sought to propose a new type of vibration absorbing device combining a number of the advantages of NESs and NVDs, in particular for use in an automotive, rail-bound or aeronautical vehicle, etc.

Aims of the Invention

The invention aims to provide a vibration absorbing device enabling at least one of the disadvantages of the prior art absorbing devices to be overcome.

The invention aims in particular to provide, in at least one embodiment, an effective, passive vibration absorbing device which is resistant to high temperatures.

In at least one embodiment of the invention, the invention also aims to provide a vibration absorbing device which can be attached to the component to be protected with a single point of attachment.

DESCRIPTION OF THE INVENTION

In order to achieve this, the invention relates to a vibration absorbing device comprising:
- a housing,
- a membrane enclosed in the housing and thus forming two chambers in the housing, said chambers being filled with a fluid,
- at least one weight, arranged on the membrane so that a movement of the weight causes a movement of the membrane,
- at least one duct configured to permit the fluid to flow between the two chambers if the membrane and the weight move.

A vibration absorbing device in accordance with the invention thus makes it possible to combine the elementary principles of the NES- and NVD-type devices by combining a weight which triggers a resonance instability in order to capture the energy of the vibrations, and initiation of fluid movement for the dissipation of energy via the movement of the membrane and the displacement of the fluid from one chamber to the other. In particular, the membrane and the weight specifically permit the vibration absorbing device to implement the elementary principles of an NES-type non-linear energy sink vibration absorbing device. In particular, the weight forms the useful mass and the membrane forms the element having a non-linear stiffness. The duct accompanied by the movement of the membrane permits the fluid to flow so as to dissipate the energy and thus implement the elementary principles of an NVD-type non-linear viscous damper device.

The presence of the weight permits the linear resonance frequency to be controlled. In particular, the weight permits the linear resonance frequency of the system to be reduced so as to ensure that the linear resonance frequency of the vibration absorbing device is lower than the linear resonance frequency of the component to be protected. The absorbing device is actually configured, in a passive manner, to increase its resonance frequency when the vibration intensity increases. It is thus enabled always to be able to reach the linear resonance frequency of the system to be protected when the level of vibration intensity increases sufficiently. When the intensity of the vibrations is low, the linear resonance frequency of the weight is lower than the linear resonance frequency of the component to be protected and there is thus only slight dissipation of energy, which is not a problem because the vibration intensity is low. When the vibration intensity becomes high, the linear resonance frequencies of the weight and of the component to be protected match and the capturing of energy by the weight is considerable, which permits good dissipation of the energy by the vibration absorbing device.

The "linear resonance frequency" designates the frequency at which a system subjected to vibrations has its peak of excitation.

By virtue of this weight, the vibration absorbing device thus permits the transfer of some of the vibratory energy from the component to be protected when the resonance frequencies of the two systems are equal.

The weight and the membrane have a mass preferably between 0.5% and 2% of the mass of the component to be protected, and a structural part (formed in particular by the housing defining the chambers), the mass of which can vary between 1 and 10% of the system to be protected.

The weight is preferably arranged at the center of the membrane in order to maximize the effect of the reduction in the resonance frequency of the system.

In contrast to the NES of the prior art, in which the elastomer springs permitted the absorption of the energy, the dissipation of the energy is permitted in this case by the displacement of the fluid between the two chambers via the duct or ducts. Upon displacement thereof, the membrane places each of the two chambers under positive or negative pressure, which causes the fluid to be displaced in the duct or ducts, and thus the dissipation of the energy by the fluid brushing against the wall. The fluid can be a liquid or a gas and may be viscous or non-viscous. The vibration absorbing device in accordance with the invention is thus passive because it does not require monitoring or control in order for it to function. The device in accordance with the invention is thus particularly useful in a context where the elastomer cannot be used as a material to form the membrane, e.g. when severe thermal stresses apply, in particular high-temperature environments.

The volumes of the chambers are sufficiently great to permit the movement of the membrane and of the weight, and sufficiently small that the movement of the membrane causes a variation in the pressure in each chamber sufficiently large to cause the displacement of the fluid in the duct or ducts. In particular, the height of each chamber is preferably between 100% and 500% of the maximum displacement of the membrane and of the weight in said chamber. The volume, shape and dimensions of one chamber may be different from or identical to the volume, shape and dimensions of the other chamber.

For example, the fluid used can be air, which dissipates well at very high speed because the aerodynamic drag force is proportional to the square of the speed. The fluid being displaced can reach speeds up to about 0.8 Mach, which improves the dissipation of energy all the more.

The membrane has a thickness which may or may not be constant: advantages of a constant-thickness membrane are ease of modelling and manufacture and lower cost. A variable-thickness membrane may be designed in order to optimize the performance of the vibration absorbing device. The thickness of the membrane is between 50 μm and several millimeters, e.g. between 50 μm and about ten millimeters in an aeronautical application.

For the same reasons, the membrane may or may not be isotropic: advantages of an isotropic membrane are ease of modelling and manufacture and lower cost. An anisotropic membrane may be designed to optimize the performance of the vibration absorbing device.

The weight is fixed to the membrane e.g. by inserting the weight into a hole pierced in the membrane and fixedly attaching it to the membrane by fixing means (e.g. a nut and bolt) or by welding or brazing.

The vibration absorbing device in accordance with the invention differs from the NVD-type devices because it permits the energy to be dissipated by the use of a fluid but using only a single point of attachment, thus without requiring two points of attachment in phase opposition. This mechanism is rendered possible because the absorbing device manages to lock its resonance frequency to that of the system to be protected, thus bringing about the energy exchange. The vibration absorbing device thus does not require the presence of two points of attachment to cause the displacement of the fluid or the dissipation of the energy.

A point of attachment is understood to be a point or set of points close together in a restricted zone permitting the vibration absorbing device to be connected to the component to be protected. The point of attachment can be a set of points in the sense that a number of attachment means (screws, studs, rivets, etc.) can be used to connect the vibration absorbing device to the component while forming—from the point of view of the mechanical behavior of the vibration absorbing device—a single point of attachment, since these attachment means are arranged in a restricted zone. In particular, the vibrations of the component are transmitted to the vibration absorbing device only at this point of attachment. This transmission can be represented by a point force.

The addition of mass constituted by the vibration absorbing device is negligible with respect to the component which it protects. Thus the device has little impact in terms of mass on the system and its modularity permits it to be installed very easily on the system to be protected.

The choice of the type of fluid, the dimensions of the membrane, the dimensions of the chambers containing the fluid, the mass of the weight, the shapes of the ducts and the materials used will be dependent on the system which is intended to be protected, the levels of stress, the temperature and the frequency of the normal mode of the component which is intended to be protected.

Advantageously and in accordance with the invention the membrane is produced from a material from the list of the following materials:

aluminum, steel,

Inconel®, in particular Inconel® X750.

According to this aspect of the invention, the membrane can carry out its function in the vibration absorbing device within a wide temperature range, in particular at high temperatures (e.g. from −55° C. to temperatures higher than 200° C., preferably at least up to 750° C.).

The membrane can be produced from other materials which meet the criteria of mechanical strength and thermal resistance which are required to obtain the technical effect of the membrane in the vibration absorbing device.

Advantageously and in accordance with the invention, the weight comprises a duct to permit the fluid to flow between the two chambers.

According to this aspect of the invention, the duct is pierced directly in the weight, which permits a considerable gain in terms of size because there is no need to add ducts which would pass around the membrane in order to connect the two chambers separated by the membrane.

The duct of the weight is preferably pierced in the center of the weight.

Advantageously and in accordance with the invention, the membrane comprises a duct to permit the fluid to flow between the two chambers.

According to this aspect of the invention, the duct is pierced directly in the membrane, which permits a considerable gain in terms of size because there is no need to add ducts which would pass around the membrane in order to connect the two chambers separated by the membrane.

When a duct is pierced in the membrane and/or the weight, the diameter is preferably of the order of magnitude of millimeters, e.g. between 0.1 mm and 10 mm. This diameter may be larger or smaller according to the application, depending on the size and/or mass of the component to be protected, the size and/or mass of the vibration absorbing device, the fluid used, etc. In the field of aeronautical, rail-bound or automotive vehicles, the diameter is preferably less than 5 cm.

In particular, advantageously and in accordance with the invention, the diameter of the duct is generally between 1% and 10% of the diameter of the membrane if this membrane is substantially circular, more generally between 1% and 10% such as a length or a diagonal of the membrane if this membrane is of a different shape. This diameter, this length or this diagonal, depending on the shape of the membrane, is referred to as the main length.

A number of ducts may be pierced in the weight and/or the membrane.

Advantageously and in accordance with the invention, the fluid is air.

According to this aspect of the invention the use of air as the energy-dissipating fluid has the advantage of posing no leakage problems in the system and no risk of overheating or explosion at high temperatures (above 200° C.). The dissipation of the energy by air is effected by friction, by the drag of the air in the ducts. The NVD-type energy absorption devices require a viscous fluid because the displacement speeds are low and the levels of energy dissipated only by friction would be too low with air. In the vibration absorbing device in accordance with the invention, the capturing of energy by the membrane and the weight is highly energetic, which causes displacements of the air at speeds which can reach about 0.8 Mach, thus permitting a large dissipation of energy without requiring viscous fluid such as oil which poses leakage and behavior problems at high temperature.

The invention also relates to a component which may be subjected to vibrations, characterized in that it comprises a vibration absorbing device in accordance with the invention configured to at least partially absorb the vibrations to which the component is subjected.

The invention also relates to a vibration absorbing device and a component which are characterized in combination by all or some of the features mentioned above or below.

LIST OF FIGURES

Other aims, features and advantages of the invention will become apparent upon reading the following description given solely by way of non-limiting example and which makes reference to the attached figures in which:

FIG. 1 is a schematic view of a vibration absorbing device in accordance with one embodiment of the invention.

FIG. 2 is a schematic view of a vibration absorbing device in accordance with one embodiment of the invention.

FIG. 3 is a diagram modelling the mechanical behavior of a component protected by a vibration absorbing device in accordance with one embodiment of the invention.

DETAILED DESCRIPTION OF AN EMBODIMENT OF THE INVENTION

In the figures, for the sake of illustration and clarity, scales and proportions have not been strictly respected.

Furthermore, identical, similar or analogous elements are designated by the same reference signs in all the figures.

FIGS. 1 and 2 schematically illustrate the basic principle of a vibration absorbing device 10 in accordance with one embodiment of the invention, in a lateral cross-sectional view and perspective cross-sectional view respectively.

The vibration absorbing device 10 comprises a housing 12, a membrane 14 and a weight 16.

The membrane 14 is enclosed in the housing 12 and thus forms two chambers, a first chamber referred to as upper chamber 18a, and a second chamber referred to as lower chamber 18b. The terms "upper" and "lower" are used only for illustrative purposes in reference to the cross-sectional view of FIG. 1 and in no way restrict the orientation of the vibration absorbing device on the component.

The membrane 14 is circular in this embodiment and can also be of other shapes in other embodiments, e.g. rectangular, square, etc. In particular, the membrane takes the shape of the housing so as to form the two chambers in the housing no matter the shape of the housing.

The membrane 14 is preferably of a constant and isotropic thickness. For example, the membrane is produced from one of the following materials: aluminum, steel, Inconel®, in particular Inconel X750®.

The housing 12 is configured to be fixed to a component 20 so as to absorb the vibrations to which the component 20 is subjected. In order to do this, the housing 12 comprises a point of attachment 22.

The absorption of the vibrations by the vibration absorbing device 10 is effected by virtue of the setting in motion of the membrane 14 and the weight 16, which create a resonance instability in order to capture the vibration energy. The weight 16 is arranged on the membrane, preferably close to the center of the membrane or at the center of the membrane.

The movements of the membrane 14 and of the weight 16 cause over-pressure in one of the chambers and negative pressure in the other chamber. Some of the fluid contained in the over-pressure chamber is thus displaced towards the negative pressure chamber by flowing through at least one duct 24. The displacement of the fluid in the duct 24 permits the dissipation of the energy by the fluid brushing against the wall of the duct 24.

In this embodiment, the duct 24 is pierced in the weight in order to save space. In other embodiments, the duct may extend outside the housing so as to connect the two chambers. The duct is configured to place the two chambers in fluid communication.

In FIG. 1, the weight 16 is illustrated in an at-rest position, with no vibrations present.

In FIG. 2, the weight 16 is illustrated out of its at-rest position, and the membrane 14 is deformed, following the capture of the vibration energy, with respect to the dotted line 114 representing the position of the membrane 14 at rest. In this configuration, the upper chamber 18a is in a state of over-pressure and the lower chamber 18b is in a state of negative pressure, which causes the fluid to flow from the upper chamber 18a to the lower chamber 18b. By reason of the amount of energy captured around the linear resonance frequency, the flow of the fluid can reach high speeds, e.g. 0.8 Mach for air, which causes a strong dissipation of energy owing to the drag of the air and the friction on the walls of the duct.

FIG. 3 schematically illustrates a model of the mechanical behavior of a component protected by a vibration absorbing device in accordance with one embodiment of the invention.

The component is illustrated by a mass m1, connected to another element, e.g. a chassis 300, by a spring with a stiffness k1 and a damper with a damping level c1. The spring and the damper are models of the mechanical behavior of the connection between the component and the chassis and in no way assume the physical reality of the components forming this connection, which may vary in nature and is not stipulated here.

The weight and the membrane of the vibration absorbing device are represented by a mass m2, connected to the component by a spring with a stiffness k2 and a damper with a damping level c2. For the most part, the stiffness k2 is made up of the stiffness of the membrane and the stiffness of the air compressed by the membrane in the two chambers upon displacement of the weight and of the membrane. The damping level c2 results from the flow of the fluid between the two chambers via the duct, the membrane having no, or very little, self-damping.

The invention is not limited to the embodiments described above. In particular, the dimensions of the device, the shape of the housing, the dimensions and the thickness of the membrane, the dimensions and the mass of the weight, etc. can vary in order to be adapted to the component to be protected, to the maximum size which the device must not exceed, to the configuration of the component and of the device in the vehicle on which they are mounted, etc.

The invention claimed is:

1. A vibration absorbing device comprising:
a housing,
a membrane enclosed in the housing and thus forming two chambers in the housing, said chambers being filled with a gas,
at least one weight arranged on the membrane-so that a movement of the weight causes a movement of the membrane, and
at least one duct configured to permit the gas to flow between the two chambers if the membrane and the weight move, the membrane being configured, upon said movement, to place each of the two chambers alternatively under positive or negative pressure, causing the gas to be displaced in the duct or ducts and thus dissipating the energy by the gas brushing against walls of the duct.

2. The vibration absorbing device as claimed in claim 1, wherein the membrane-is produced from a material selected from the group consisting of:
aluminum,
steel,
a high temperature nickel-chromium alloy.

3. The vibration absorbing device as claimed in claim 1, wherein the weight comprises a duct to permit the gas to flow between the two chambers.

4. The vibration absorbing device as claimed in claim 3, wherein said duct of the weight is pierced in the center of the weight.

5. The vibration absorbing device as claimed in claim 1, wherein the membrane comprises a duct to permit the gas to flow between the two chambers.

6. The vibration absorbing device as claimed in claim 1, wherein the gas is air.

7. The vibration absorbing device as claimed in claim 1, wherein the weight is arranged at the center of the membrane.

8. The vibration absorbing device as claimed in claim 1, wherein the diameter of at least one duct is between 1% and 10% of a main length of the membrane.

9. A component which may be subjected to vibrations, comprising a vibration absorbing device configured to at least partially absorb the vibrations to which the component is subjected, the device comprising:
a housing,
a membrane enclosed in the housing and thus forming two chambers in the housing, said chambers being filled with a gas,
at least one weight arranged on the membrane so that a movement of the weight causes a movement of the membrane, and
at least one duct configured to permit the gas to flow between the two chambers if the membrane and the weight move.

* * * * *